US012135033B2

(12) United States Patent
Schou et al.

(10) Patent No.: US 12,135,033 B2
(45) Date of Patent: Nov. 5, 2024

(54) MONITORING MODULE AND METHOD FOR IDENTIFYING AN OPERATING SCENARIO IN A WASTEWATER PUMPING STATION

(71) Applicant: GRUNDFOS HOLDING A/S, Bjerringbro (DK)

(72) Inventors: Christian Schou, Engesvang Engesvang (DK); Christian Robert Dahl Jacobsen, Aalborg SØ (DK); Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 915 days.

(21) Appl. No.: 17/054,419

(22) PCT Filed: May 2, 2019

(86) PCT No.: PCT/EP2019/061210
§ 371 (c)(1),
(2) Date: Nov. 10, 2020

(87) PCT Pub. No.: WO2019/215000
PCT Pub. Date: Nov. 14, 2019

(65) Prior Publication Data
US 2021/0215158 A1 Jul. 15, 2021

(30) Foreign Application Priority Data
May 11, 2018 (EP) .................................... 18171929

(51) Int. Cl.
*F04D 15/00* (2006.01)
*F04D 13/06* (2006.01)
*F04D 13/12* (2006.01)

(52) U.S. Cl.
CPC ......... *F04D 15/0088* (2013.01); *F04D 13/06* (2013.01); *F04D 13/12* (2013.01); *F05D 2260/80* (2013.01)

(58) Field of Classification Search
CPC ...... F04D 15/0088; F04D 13/06; F04D 13/12; F04D 15/0236; F04D 15/0245;
(Continued)

(56) References Cited

U.S. PATENT DOCUMENTS 4,945,491 A * 7/1990 Rishel ....................... G01L 3/26 417/19
8,594,851 B1 11/2013 Smaidris
(Continued)

OTHER PUBLICATIONS

Kallesoe CS et al: "Model based fault diagnosis in a centrifugal pump application using structural analysis", Control Applications, 2004. Proceedings of the 2004 IEEE International Conference on Taipei, Taiwan Sep. 2-4, 2004, Piscataway, NJ, USA,IEEE, vol. 2, Sep. 2, 2004 (Sep. 2, 2004), pp. 1229-1235.
(Continued)

*Primary Examiner* — Octavia Hollington
*Assistant Examiner* — Monica S Young
(74) *Attorney, Agent, or Firm* — McGlew and Tuttle, P.C.

(57) ABSTRACT

A monitoring module (13) identifies an operating scenario in a wastewater pumping station, with at least one pump (9*a*, 9*b*) arranged for pumping wastewater out of a wastewater pit (1) into a pipe (11). The monitoring module (13) is configured to process at least one load-dependent pump variable indicative of how the at least one pump (9*a*, 9*b*) operates and at least one model-based pipe parameter indicative of how the wastewater flows through the pipe (11) and/or the at least one pump (9*a*, 9*b*). The monitoring module is configured to identify an operating scenario in the wastewater pumping station by selecting an operating scenario from a group of predefined operating scenarios dependent on at least one first
(Continued)

criterion that is based on the at least one load-dependent pump variable and at least one second criterion that is based on the at least one model-based pipe parameter.

26 Claims, 9 Drawing Sheets

(58) Field of Classification Search
CPC ............... F04D 15/029; F05D 2260/80; F05D 2270/335; F05D 2270/3061; F05D 2270/3013
USPC ............................................................ 73/865
See application file for complete search history.

(56) References Cited

U.S. PATENT DOCUMENTS

| | | | | |
|---|---|---|---|---|
| 2004/0040746 | A1* | 3/2004 | Niedermayr | E21B 44/00 175/48 |
| 2008/0240931 | A1* | 10/2008 | Kallesoe | F04D 15/0236 417/44.11 |
| 2009/0295588 | A1 | 12/2009 | Saukko | |
| 2010/0300220 | A1* | 12/2010 | Vadstrup | F04B 51/00 73/865.9 |
| 2012/0101788 | A1* | 4/2012 | Kallesoe | F04D 15/0236 703/2 |
| 2013/0164146 | A1* | 6/2013 | Ahola | F04D 15/0066 417/18 |
| 2017/0184429 | A1* | 6/2017 | Kallesøe | E03F 5/105 |
| 2017/0363088 | A1* | 12/2017 | Nguyen | E21B 47/008 |

OTHER PUBLICATIONS

Jensen Tom Norgaard et al: "Application of a novel leakage detection framework for municipal water supply on AAU water supply lab", 2016 3rd Conference on Control and Fault-Tolerant Systems (SYSTOL), IEEE, Sep. 7, 2016 (Sep. 7, 2016), pp. 428-433, XP032995651, DOI: 10.1109/SYSTOL.2016.7739787, p. 431, col. 1, last two paragraphs.

* cited by examiner

| | $E_{sp}$ rising pump 9a | $E_{sp}$ rising pump 9b | $E_{sp}$ falling pump 9a | $E_{sp}$ falling pump 9b | $r \neq 0$ | $\gamma = 0$ |
|---|---|---|---|---|---|---|
| **Clogging in pipe** | X | X | | | X | |
| **Clogging or fault in pump 9a** | X | | | | | |
| **Clogging or fault in pump 9b** | | X | | | | |
| **Leak in pump 9a connection** | | | X | | X | |
| **Leak in pump 9b connection** | | | | X | X | |
| **Leak in non-return valve for pump 9a** | | | | X | X | X |
| **Leak in non-return valve for pump 9b** | | | X | | X | X |

Fig. 8

| | $E_{sp}$ rising pump 9a | $E_{sp}$ rising pump 9b | $E_{sp}$ falling pump 9a | $E_{sp}$ falling pump 9b | $r \neq 0$ | $\gamma = 0$ |
|---|---|---|---|---|---|---|
| **Clogging in pipe** | X | X | | | X | |
| **Clogging or fault in pump 9a** | X | | | | | |
| **Clogging or fault in pump 9b** | | X | | | | |
| **Leak in pump 9a connection** | X | | | | X | |
| **Leak in pump 9b connection** | | X | | | X | |
| **Leak in non-return valve for pump 9a** | | X | | | X | X |
| **Leak in non-return valve for pump 9b** | X | | | | X | X |

Fig. 9

MONITORING MODULE AND METHOD FOR IDENTIFYING AN OPERATING SCENARIO IN A WASTEWATER PUMPING STATION

CROSS REFERENCE TO RELATED APPLICATIONS

This application is a United States National Phase Application of International Application PCT/EP2019/061210, filed May 2, 2019, and claims the benefit of priority under 35 U.S.C. § 119 of European Application Ser. No. 18/171,929.5, filed May 11, 2018, the entire contents of which are incorporated herein by reference.

TECHNICAL FIELD

The present disclosure relates generally to monitoring modules and methods for identifying an operating scenario in a wastewater pumping station. In particular, such an operating scenario may be a faulty operation, such as pump fault or clogging, pipe clogging or leakage.

BACKGROUND

Sewage or wastewater collection systems for wastewater treatment plants typically comprise one or more wastewater pits, wells or sumps for temporarily collecting and buffering wastewater. Typically, wastewater flows into such pits passively under gravity flow and/or actively driven through a force main. One, two or more pumps are usually installed in or at each pit to pump wastewater out of the pit. If the inflow of wastewater is larger than the outflow for a certain period of time, the wastewater pit or sump will eventually overflow. Such overflows should be prevented as much as possible in order to avoid environmental impact. Therefore, any pump fault or clogging, pipe clogging, leakage or other type of faulty operating scenario should be identified as quickly as possible for maintenance staff to take according action, like cleaning, repairing or replacing as quickly as possible.

U.S. Pat. No. 8,594,851 B1 describes a wastewater treatment system and a method for reducing energy used in operation of a wastewater treatment facility.

It is a challenge for known wastewater pumping station management systems to reliably identify the cause for a certain problem in order to give an operator or maintenance staff a clear indication for the appropriate action, e.g. where or what needs to be cleaned, repaired or replaced.

SUMMARY

In contrast to known systems, embodiments of the present disclosure provide a monitoring module and method for identifying an operating scenario with more specific and more reliable information.

In accordance with a first aspect of the present disclosure, a monitoring module for identifying an operating scenario in a wastewater pumping station is provided, with at least one pump arranged for pumping wastewater out of a wastewater pit into a pipe, wherein the monitoring module is configured to process at least one load-dependent pump variable indicative of how the at least one pump operates and at least one model-based pipe parameter indicative of how the wastewater flows through the pipe and/or the at least one pump, and wherein the monitoring module is configured to identify an operating scenario in the wastewater pumping station by selecting an operating scenario from a group of predefined operating scenarios dependent on at least one first criterion that is based on the at least one load-dependent pump variable and at least one second criterion that is based on the at least one model-based pipe parameter.

The group of predefined operating scenarios may include faulty and/or non-faulty operating scenarios. For example, faulty operating scenarios may be a clogging of the pipe downstream of the pump(s), a clogging in one or more of the at least one pump(s), a leak in a non-return valve for one or more of the at least one pump(s), and/or a leak in a connection between one or more of the at least one pump(s) and the pipe. The combination of at least two criteria, the first one of which is based on the at least one load-dependent pump variable and the second one of which is based on the at least one model-based pipe parameter, may be interpreted by the monitoring module as a "scenario signature".

Optionally, the group of operating scenarios may be predefined in a selection matrix unambiguously associating each operating scenario with a unique combination of the at least one first criterion and the at least one second criterion. For instance, in case of a wastewater pumping station with only one pump, three different operating scenarios may be identified based on the combination of the two criteria as follows:

| | First criterion | Second criterion |
|---|---|---|
| Scenario 1; pipe is clogged | pump variable rising | pipe parameter negative or non-zero |
| Scenario 2; pump is clogged | pump variable rising | pipe parameter positive or zero |
| Scenario 3; pump connection is leaking | pump variable falling | pipe parameter negative or non-zero |

In case of a wastewater pumping station with two or more pumps, a first criterion for each pump may be used to more finely distinguish between operating scenarios in which a specific pump is clogged or pump connection is leaking, for example, three different operating scenarios may be identified based on the combination of the two criteria as follows:

| | First criterion for pump 1 | First criterion for pump 2 | Second criterion |
|---|---|---|---|
| Scenario 1; pipe is clogged | pump 1 variable rising | pump 2 variable rising | pipe parameter negative or non-zero |
| Scenario 2; pump 1 is clogged | pump 1 variable rising | pump 2 variable not rising | pipe parameter positive or zero |
| Scenario 3; pump 2 is clogged | pump 1 variable not rising | pump 2 variable rising | pipe parameter positive or zero |
| Scenario 4; pump 1 connection is leaking | pump 1 variable falling | pump 2 variable not falling | pipe parameter negative or non-zero |
| Scenario 5; pump 2 connection is leaking | pump 1 variable not falling | pump 2 variable falling | pipe parameter negative or non-zero |

In case of a wastewater pumping station with two or more pumps, only one pump is typically running at a time as long as one pump suffices for pumping enough wastewater out of the wastewater pit into the pipe. In order to evenly distribute the operating hours and wear, the pumps may be running in turns. In contrast to operating all or several pumps simultaneously, the overall operating hours, and thus wear, and the overall energy consumption may be reduced by this. Only in case more pump power is needed during times of high inflow, e.g. at heavy rain incidents, all or several pumps may run simultaneously in order to prevent an overflow. For the alternating normal operation of only one pump at a time, non-return valves may be installed for each pump to prevent the active pump from pumping wastewater through the passive pump(s) back into the wastewater pit. A leak in such a non-return valve of a passive pump may have a different scenario signature than a leak in the pump connection of the active pump if, for example, a further second criterion is used based on another model-based pipe parameter as follows:

| | First criterion for pump 1 | First criterion for pump 2 | Second criterion 1 | Second criterion 2 |
|---|---|---|---|---|
| Scenario 1; pipe is clogged | pump 1 variable rising | pump 2 variable rising | pipe parameter 1 negative | pipe parameter 2 non-zero |
| Scenario 2; pump 1 is clogged | pump 1 variable rising | pump 2 variable not rising | pipe parameter 1 positive | pipe parameter 2 zero |
| Scenario 3; pump 2 is clogged | pump 1 variable not rising | pump 2 variable rising | pipe parameter 1 positive | pipe parameter 2 zero |
| Scenario 4; pump 1 connection is leaking | pump 1 variable falling | pump 2 variable not falling | pipe parameter 1 negative | pipe parameter 2 non-zero |
| Scenario 5; pump 2 connection is leaking | pump 1 variable not falling | pump 2 variable falling | pipe parameter 1 negative | pipe parameter 2 non-zero |
| Scenario 6; pump 1 non-return valve is leaking | pump 1 variable not rising | pump 2 variable falling | pipe parameter 1 negative | pipe parameter 2 non-zero |
| Scenario 7; pump 2 non-return valve is leaking | pump 1 variable falling | pump 2 variable not rising | pipe parameter 1 negative | pipe parameter 2 non-zero |

Optionally, the at least one load-dependent pump variable may comprise a specific energy consumption $E_{sp}$ of the at least one pump. There are different ways to determine the specific energy consumption $E_{sp}$ of the at least one pump. For example, the specific energy consumption $E_{sp}$ may be defined by $E_{sp}=E/V$, wherein E is an average energy consumed by the at least one pump during a defined time period and V is the volume of wastewater pumped during said defined time period by the at least one pump. The average energy consumption may be determined by integrating or summing the current power consumption P(t) over the time t between an end of a delay period after pump start and pump stop:

$$E = \int_{t_{start}+t_{delay}}^{t_{stop}} P(t)dt.$$

Analogously, the pumped wastewater volume may be determined by integrating or summing the current flow q(t) over the same time period:

$$V = \int_{t_{start}+t_{delay}}^{t_{stop}} q(t)dt.$$

The delay period may be useful to skip an initial period of high fluctuations after start-up of the pump(s). The monitoring module may be signal connected wirelessly or via a cable with the pump(s) to receive a signal indicative of the power or energy consumption. Furthermore, the monitoring module may be signal connected wirelessly or via a cable with a flow sensor to receive a signal indicative of the flow through the pipe.

A current specific energy consumption $E_{sp}(t)$ of the at least one pump may be defined by $E_{sp}(t)=P(t)/q(t)$, wherein P(t) is a current power consumption of the at least one pump and q(t) is a current flow of wastewater pumped by the at least one pump. The current specific energy consumption $E_{sp}(t)$ may be monitored as the at least one load-dependent pump variable as an alternative to the averaged specific energy consumption $E_{sp}$ as defined above. If the current specific energy consumption $E_{sp}(t)$ fluctuates too much to the at least one first criterion on it, a low-pass filtering may be applied as explained later herein. Even in case of a specific energy consumption $E_{sp}$ that is averaged for each pump cycle, it can fluctuate between the pump cycles so much that a low-pass filtering may be advantageous.

As a flow meter may be quite expensive and may require regular maintenance, it may be preferable to estimate the outflow q of wastewater through the pump(s) based on a measured pressure differential $\Delta p$ and power consumption P. For instance, the outflow q of wastewater through the pump(s) may be estimated by $$q \approx s\frac{\lambda_0}{\omega} + s\frac{\lambda_1}{\omega}\Delta p + s\frac{\lambda_2}{\omega^2}P + s\lambda_3\omega,$$

wherein s is the number of running pumps, $\omega$ is the pump speed (e.g. constant), $\Delta p$ is the measured pressure differential, P is the power consumption of the running pump(s), and $\lambda_0$, $\lambda_1$, $\lambda_2$ and $\lambda_3$ are pump parameters that may be known from the pump manufacturer or determined by calibration. Accordingly, the monitoring module may be signal connected wirelessly or via a cable with a pressure sensor, which is located at or downstream of the pump(s), to receive a signal indicative of the pressure differential $\Delta p$. So, optionally, the monitoring module may be configured to receive a measured pressure $p_m$ at or downstream of an outlet of the at least pump. Alternatively or in addition, the monitoring module may be configured to receive a measured flow $q_m$ through the pipe or to process an estimated wastewater flow $q_e$ through the pump.

It is important to note that the "scenario signature" may depend on whether a flow q through the pipe is measured or a flow q through the pump(s) is estimated. For instance, a leak in a pump connection or in a non-return valve may result in a rising specific energy consumption $E_{sp}$ when the flow q through the pipe is measured. However, if a flow q through the pump(s) is estimated, the specific energy consumption $E_{sp}$ may turn out to be falling. Therefore, the monitoring module may be configured to apply one of at least two predefined selection matrices dependent on whether a flow q through the pipe is measured or a flow q through the pump(s) is estimated. Each of the at least two selection matrices unambiguously associate each operating scenario with a unique combination of the at least one first criterion and the at least one second criterion.

Optionally, one of the at least one model-based pipe parameter may be a pipe clogging parameter A in a pipe model polynomial $p=Aq^2+B$, wherein p is a pressure at or downstream of an outlet of the at least pump, q is a wastewater flow through the pipe and/or the at least one pump, and B is a zero-flow offset parameter. The zero-flow offset parameter B may be a second one of at least two model-based pipe parameters, wherein the pipe clogging parameter A may be a first one of the at least two model-based pipe parameters.

Alternatively or in addition, one of the at least one model-based pipe parameter may be a residual $r=p_m-p_e=p_m-Aq^2-B$ between a measured pressure $p_m$ at or downstream of an outlet of the at least pump and an estimated pressure $p_e$ according to a pipe model polynomial $p_e=Aq^2+B$, wherein A is a pipe clogging parameter of the pipe, q is a wastewater flow through the pipe and/or the at least one pump and B is a zero-flow offset parameter. The residual r may be considered as a pipe model testing parameter. If the residual r deviates from zero by more than a certain threshold, e.g. 100 Pa, one of the at least one second criterion may be fulfilled, otherwise not. Such a fulfilled second criterion may mean a "model mismatch", indicating a pipe clogging, whereas a non-fulfilled second criterion may mean a "model match", indicating a pump problem rather than a pipe clogging. As described above, a leak in a pump connection or in a non-return valve may show a model mismatch when the flow through the pump(s) is estimated, but a model match if a flow q through the pipe is measured.

Optionally, the monitoring module may be configured to apply a low-pass filtering to the at least one load-dependent pump variable and/or the at least one model-based pipe parameter before selecting an operating scenario dependent on the at least one first criterion and/or second criterion, respectively. This may be very helpful to cope with fluctuations of the load-dependent pump variable, e.g. the specific energy consumption $E_{sp}$, and/or the pipe parameter, e.g. the pipe clogging parameter A or the residual r.

For instance, the monitoring module may be configured to sequentially process a multitude of samples of the at least one load-dependent pump variable, wherein the at least one first criterion is based on whether a cumulative sum of deviations between the actual sample and an average of past samples of the at least one load-dependent pump variable exceeds a predetermined maximum or falls below a predetermined minimum. Such a low-pass filtering may follow a so called iterative CUSUM (cumulative sum) algorithm such as:

$$S_{up}(i+1)=\max[0,S_{up}(i)+G_{up}(x-n\sigma)]$$

$$S_{down}(i+1)=\max[0,S_{down}(i)-G_{down}(x-n\sigma)],$$

wherein $S_{up}$ and $S_{down}$ are decision variables summing up deviations using a test variable x. The test variable x may, for instance, be defined as the deviation of the specific energy consumption in the i-th pump cycle from an average specific energy consumption $E_{sp}$, i.e. $x=E_{sp}-\overline{E}_{sp}$. The average specific energy consumption $E_{sp}$ may be a predefined value or a value statistically determined over several previous pump cycles during normal faultless operation. For instance, it may be useful to identify non-faulty operating scenarios to statistically determine an average specific energy consumption $\overline{E}_{sp}$. Dependent on the variance of x, the decision variables may be tuned by gain parameters $G_{up}$ and $G_{down}$. Fluctuations below a certain number n, e.g. n=1, 2 or 3, of standard deviations a may be suppressed for the decision variables. Similar to the average specific energy consumption $\overline{E}_{sp}$, the standard deviation a may be statistically determined over several previous pump cycles during normal faultless operation.

A first one of the at least one first criterion based on the specific energy consumption $E_{sp}$ may be whether the decision variable $S_{up}$ is above or below an alarm threshold indicating that the specific energy consumption $E_{sp}$ is rising. A second one of the at least one first criterion based on the specific energy consumption $E_{sp}$ may be whether the decision variable $S_{down}$ is above or below an alarm threshold indicating that the specific energy consumption $E_{sp}$ is falling. An estimation of the flow through the pump based on pressure and power consumption of the pump(s) has, compared to a flow measured by a flow meter, not only the advantage that a flow meter can be spared with, but also that the scenario signature is different in cases of a leakage of a pump connection or a non-return valve. In those cases, the specific energy consumption $E_{sp}$ would appear as falling if the flow through the pump is estimated. If the flow through pipe is measured, the specific energy consumption $E_{sp}$ would be rising in case of pipe clogging, pump fault/clogging and leakage of a pump connection or a non-return valve. In case of a wastewater pumping station with $m\geq 2$ pumps, there may be two first criteria per pump, i. e. 2 times m first criteria to identify the operating scenario.

A similar low-pass filtering may be applied to the at least one model-based pipe parameter before selecting an operating scenario dependent on the at least one second criterion. So, optionally, the monitoring module may be configured to sequentially process a multitude of samples of the at least one model-based pipe parameter, wherein the at least one second criterion is based on whether a cumulative sum of deviations between the actual sample and an average of past samples of the at least one model-based pipe parameter exceeds a predetermined maximum or falls below a predetermined minimum.

For instance, the evolvement of the pipe clogging parameter A may be monitored by decision variables $S_{up}$ and $S_{down}$ with a test variable x being defined as the deviation of the pipe clogging parameter A in the i-th pump cycle from an average pipe clogging parameter A, i.e. $x=A-\overline{A}$. Kalman filters may be applied to calculate the mean and variance of the pipe clogging parameter. As an alternative or in addition, the residual r for testing whether the pipe model still matches with reality may be used as test variable x, i.e. x=r. In this case, a combined decision variable $S=S_{up}+S_{down}$ may be used to indicate a model mismatch, because there is no need to distinguish between upward and downward fluctuations.

Optionally, the monitoring module may be configured to process a first of at least two model-based pipe parameters and a zero-flow offset parameter as a second of the at least two model-based pipe parameters, wherein the negative-flow parameter is indicative of how the wastewater flows through the pipe and/or the at least one pump when the at least one pump is stopped, wherein the monitoring module may be configured to identify an operating scenario in the wastewater pumping station by selecting an operating scenario from a group of predefined operating scenarios further dependent on at least one third criterion that is based on the negative-flow parameter. Optionally, the negative-flow parameter may show as a decay of the zero-flow offset parameter B in a pipe model polynomial $p=Aq^2+B$, wherein p is a pressure at or downstream of an outlet of the at least one pump, q is a wastewater flow through the pipe and/or the at least one pump, and A is a pipe clogging parameter.

Alternatively or in addition, the negative-flow parameter may be a leakage flow through one of the non-return valves or a pump connection, for instance, which will gradually lead to a pressure decay when the at least one pump is stopped. This may be formulated by $D\dot{p}=-q$, wherein D is the cross-sectional area of the pipe, $$\dot{p}=\frac{dp}{dt}$$

is the change in pressure at the outlet of a pump over time, and q is the leakage flow. Following Toricelli's law, the leakage flow may be calculated by $q=K\sqrt{p-\rho gh-\Delta p_0}$, wherein K is a constant, ρ is the density of the wastewater, p is the measured pressure at the pump outlet, h is the wastewater's height above a hydrostatic pressure sensor for level measurement at the bottom of the pit, and $\Delta p_0$ is a hydrostatic pressure of a difference in geodetic elevation between the pump outlet and the bottom of the pit. This leads to a differential equation as follows: $A\dot{p}=K\sqrt{p-\rho gh-\Delta p_0}$, which may be approximated by discrete test samples i as follows:

$$p_{i+1}-p_i=-h\frac{K}{A}\sqrt{p_i-\rho gh_i-\Delta p_0},$$

so that a decision variable $$\gamma=-h\frac{K}{A}=\frac{\sqrt{p_i-\rho gh_i-\Delta p_0}}{p_{i+1}-p_i}$$

may be tested as a third criterion for hypotheses $H_0$ and $H_1$, wherein $H_0$: γ=0 and $H_1$: γ≠0. If hypothesis $H_0$ cannot be rejected, there is probably a leak in the non-return-valve. If the decision variable γ is above a threshold value, for instance 0.1, the hypothesis $H_0$ may be rejected. The threshold value for this third criterion may be adjusted to an acceptable compromise between the sensitivity for a leakage and a false alarm rate.

In accordance with a second aspect of the present disclosure and analogous to the monitoring module described above, a method is provided for identifying an operating scenario in a wastewater pumping station with at least one pump arranged for pumping wastewater out of a wastewater pit into a pipe, wherein the method comprises:

- processing at least one load-dependent pump variable indicative of how the at least one pump operates and at least one model-based pipe parameter indicative of how the wastewater flows through the pipe and/or the at least one pump, and
- selecting an operating scenario from a group of predefined operating scenarios dependent on at least one first criterion that is based on the at least one load-dependent pump variable and at least one second criterion that is based on the at least one pipe parameter.

Optionally, the group of operating scenarios may be predefined in a selection matrix unambiguously associating each operating scenario with a unique combination of the at least one first criterion and the at least one second criterion.

Optionally, the at least one load-dependent pump variable may be a specific energy consumption $E_{sp}$ of the at least one pump.

Optionally, the specific energy consumption $E_{sp}$ of the at least one pump may be defined by $E_{sp}=E/V$, wherein E is an average energy consumed during a defined time period and V is the volume of wastewater pumped during said defined time period by the at least one pump.

Optionally, the specific energy consumption $E_{sp}$ of the at least one pump may be defined by $E_{sp}=P/q$, wherein P is a power consumption and q is a flow of wastewater pumped by the at least one pump.

Optionally, the at least one model-based pipe parameter may be a pipe clogging parameter A in a pipe model polynomial $p=Aq^2+B$, wherein p is a pressure at or downstream of an outlet of the at least pump, q is the wastewater flow through the pipe and/or the at least one pump, and B is a zero-flow offset parameter.

Optionally, the at least one model-based pipe parameter may be a residual $r=p_m-p_e=p_m-Aq^2-B$ between a measured pressure $p_m$ at or downstream of an outlet of the at least pump and an estimated pressure $p_e$ according to a pipe model polynomial $p_e=Aq^2+B$, wherein A is a pipe clogging parameter of the pipe, q is the wastewater flow through the pipe and/or the at least one pump and B is a zero-flow offset parameter.

Optionally, the method may further comprise a step of receiving a measured pressure $p_m$ at or downstream of an outlet of the at least pump.

Optionally, the method may further comprise a step of receiving a measured flow $q_m$ or processing an estimated wastewater flow $q_e$ through the at least one pump.

Optionally, the method may further comprise a step of applying a low-pass filtering to the at least one load-dependent pump variable and/or the at least one model-based pipe parameter before selecting an operating scenario dependent on at least one first criterion and/or second criterion, respectively.

Optionally, the method may further comprise a step of sequentially processing a multitude of samples of the at least one load-dependent pump variable, wherein the at least one first criterion is based on whether a cumulative sum of deviations between the actual sample and an average of past samples of the at least one load-dependent pump variable exceeds a predetermined maximum or falls below a predetermined minimum.

Optionally, the method may further comprise a step of sequentially processing a multitude of samples of the at least one model-based pipe parameter, wherein the at least one second criterion is based on whether a cumulative sum of deviations between the actual sample and an average of past samples of the at least one model-based pipe parameter exceeds a predetermined maximum or falls below a predetermined minimum.

Optionally, the method may further comprise the steps of

- processing a first of at least two model-based pipe parameters,
- processing a negative-flow parameter as a second of the at least two model-based pipe parameters, wherein the negative-flow parameter is indicative of how the wastewater flows through the pipe and/or the at least one pump when the at least one pump is stopped, and
- selecting an operating scenario from a group of predefined operating scenarios further dependent on at least one third criterion that is based on the negative-flow parameter.

The monitoring module described above and/or some or all of the steps of the method described above may be implemented in form of compiled or uncompiled software code that is stored on a computer readable medium with instructions for executing the method. Alternatively or in addition, some or all method steps may be executed by software in a cloud-based system, in particular the monitoring module may be partly or in full implemented on a computer and/or in a cloud-based system.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 8 is a view showing a first example of a selection matrix applied by an example of the monitoring module according to the present disclosure; and FIG. 9 is a view showing a second example of a selection matrix applied by an example of the monitoring module according to the present disclosure;

DETAILED DESCRIPTION

Figure 1:
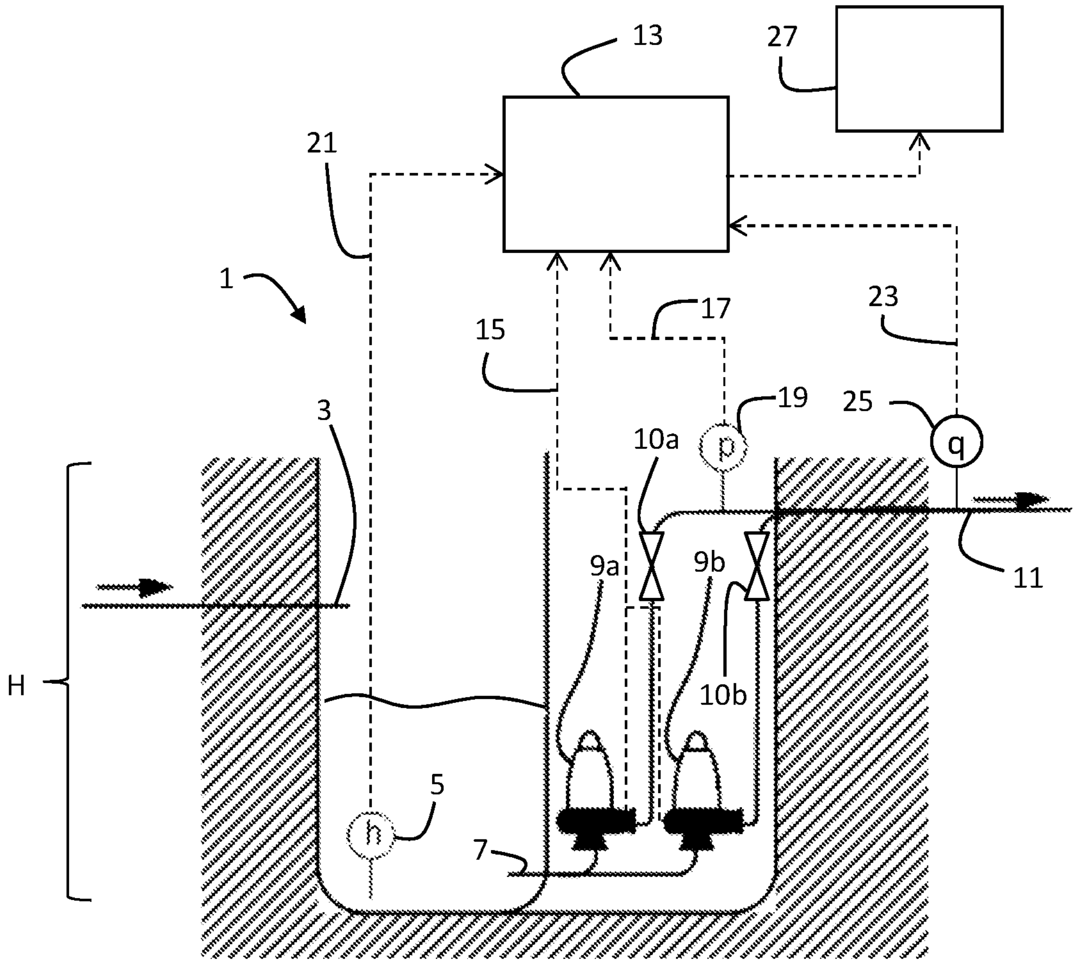
FIG. 1 is a schematic cross-sectional view on a wastewater pit of a wastewater pumping station with two pumps, wherein the wastewater pumping station is connected with an example of the monitoring module according to the present disclosure.

FIG. 1 shows a wastewater pit 1 of a wastewater pumping station. The wastewater pit 1 has a certain height H and can be filled through an inflow port 3. The current level of wastewater is denoted as h and may be continuously or regularly monitored by means of a level sensor 5, e.g. a hydrostatic pressure sensor at the bottom of the wastewater pit 1 and/or an ultrasonic distance meter for determining the surface position of the wastewater in the pit 1 by detecting ultrasonic waves being reflected by the wastewater surface. Alternatively or in addition, the wastewater pit 1 may be equipped with one or more photoelectric sensors or other kind of sensors at one or more pre-defined levels for simply indicating whether the wastewater has reached the respective pre-defined level or not.

The wastewater pumping station further comprises an outflow port 7 near the bottom of the wastewater pit 1, wherein the outflow port 7 is in fluid connection with two pumps 9*a*, 9*b* for pumping wastewater out of the wastewater pit into a pipe 11. The pumps 9*a*, 9*b* may be arranged, as shown in FIG. 1, outside of the wastewater pit 1 or submerged at the bottom of the wastewater pit 1 in form of submersible pumps. A non-return valve 10*a*, 10*b* at or after each pump 9*a*, 9*b* prevents a backflow when one of the pumps 9*a*, 9*b* is idle and the other one of the pumps 9*b*, 9*a* is running. A monitoring module 13 is configured to identify operating scenarios and to output an according information and/or alarm on an output device 27. The output device 27 may be a display and/or a loudspeaker on a mobile or stationary device for an operator to take notice of a visual and/or acoustic signal as the information and/or alarm.

Figure 2:
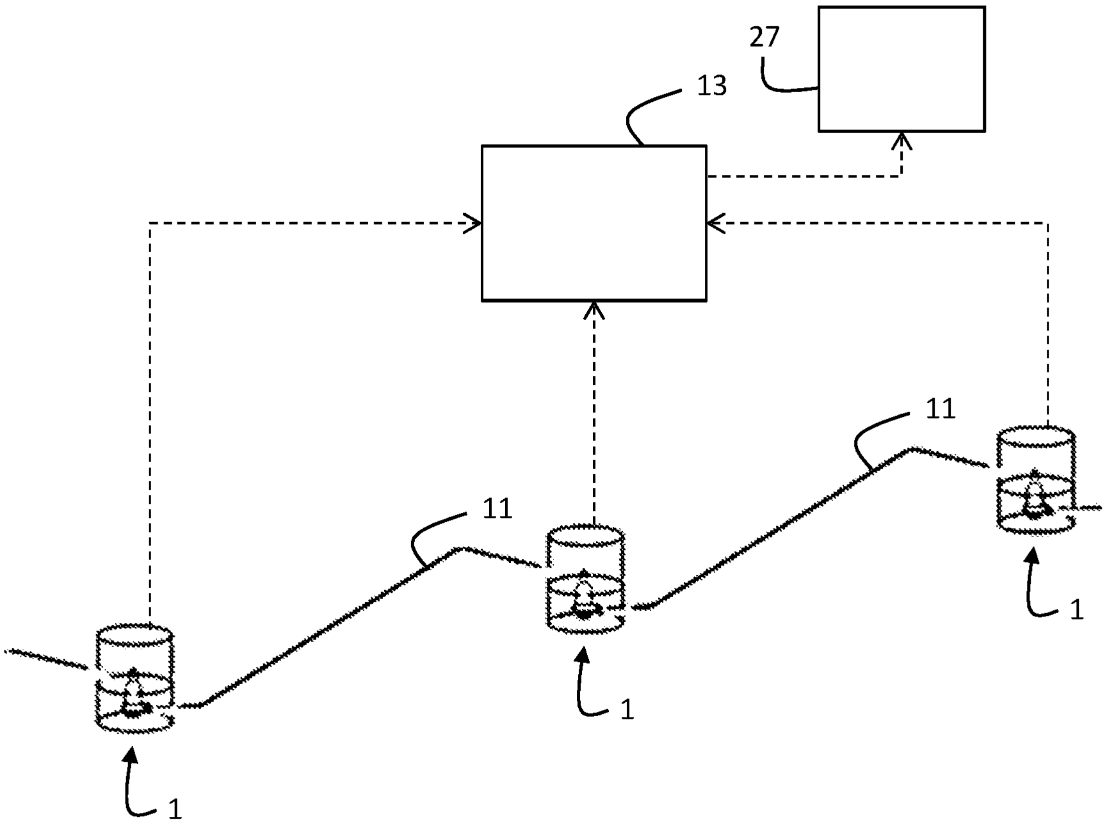
FIG. 2 is a schematic view on a chain of wastewater pumping stations, wherein each wastewater pumping station is connected with an example of the monitoring module according to the present disclosure.

FIG. 2 shows a chain of wastewater pumping stations being connected by respective pipes 11 through which a lower level wastewater pumping station is able to pump wastewater to the next higher level wastewater pumping station against gravity. Each of the wastewater pumping stations may be monitored by a monitoring module 13 in order to identify operating scenarios.

The monitoring module 13 is configured to identify an operating scenario in the wastewater pumping station by selecting an operating scenario from a group of predefined operating scenarios dependent on at least one first criterion that is based on at least one load-dependent pump variable and at least one second criterion that is based on at least one model-based pipe parameter. In order to do this, as shown in FIG. 1, the monitoring module 13 is signal connected with the with power electronics of the pumps 9*a*, 9*b* and/or power sensors in the pumps 9*a*, 9*b* of the wastewater pumping station(s) to receive a power signal indicative of a power consumption of each of the pumps 9*a*, 9*b* via wired or wireless signal connection 15. Depending on which sensors are available in the wastewater pumping station, further signal connections between the monitoring module 13 and available sensors are shown in FIG. 1 as options that may be implemented alone or in combination with one or two of other options. The first option is a wired or wireless signal connection 17 with a pressure sensor 19 at or downstream of the pump 9*a*. The second option is a wired or wireless signal connection 21 with the level sensor 5. The third option is a wired or wireless signal connection 23 with a flow meter 25 at or downstream of the pump 9*a*. The signal connections 15, 17, 21, 23 may be separate communication channels or combined in a common communication channel or bus. The monitoring module 13 is configured to receive a respective pressure, power and/or flow signal via the signal connections 15, 17, 23 and to process accordingly at least one load-dependent pump variable indicative of how the pumps 9*a*, 9*b* operate and at least one model-based pipe parameter indicative of how the wastewater flows through the pipe 11 and/or the pumps 9*a*, 9*b*.

The at least one load-dependent pump variable may be a specific energy consumption $E_{sp}$ of each of the two pumps 9_a_, 9_b_. There are different ways to determine the specific energy consumption $E_{sp}$ for each pump. For example, the specific energy consumption $E_{sp}$ for one pump may be defined by $E_{sp}$=E/V, wherein E is an average energy consumed by said pump during a defined time period and V is the volume of wastewater pumped during said defined time period by said pump. The average energy consumption may be determined by integrating or summing the current power consumption P(t) over the time t between an end of a delay period after pump start and pump stop:

$$E = \int_{t_{start}+t_{delay}}^{t_{stop}} P(t)dt.$$

Analogously, the pumped wastewater volume may be determined by integrating or summing the current flow q(t) over the same time period:

$$V = \int_{t_{start}+t_{delay}}^{t_{stop}} q(t)dt.$$

Alternatively or in addition, a current specific energy consumption $E_{sp}(t)$ of each one of the two pumps may be defined by $E_{sp}(t)=P(t)/q(t)$, wherein P(t) is a current power consumption of said pump and q(t) is a current flow of wastewater pumped by said pump. If the current specific energy consumption $E_{sp}(t)$ fluctuates too much to the at least one first criterion on it, a low-pass filtering may be applied as explained later herein. Even in case of a specific energy consumption $E_{sp}$ that is averaged for each pump cycle, it can fluctuate between the pump cycles so much that a low-pass filtering may be advantageous.

In order to process the specific energy consumption $E_{sp}$ for each pump as the load-dependent pump variables, the monitoring module 13 receives, firstly, a power signal indicative of a power consumption of each of the pumps 9_a_, 9_b_ via the signal connection 15 and, secondly, a pressure signal from the pressure sensor 19 via the signal connection 17 and/or a flow signal from the flow meter 25 via the signal connection 23. As a flow meter may be quite expensive and may require regular maintenance, it may be preferable to estimate the flow q of wastewater through the pumps 9_a_,9_b_ based on the pressure signal and the power signal. For instance, the outflow q of wastewater through the pumps 9_a_, 9_b_ may be estimated by $$q \approx s\frac{\lambda_0}{\omega} + s\frac{\lambda_1}{\omega}\Delta p + s\frac{\lambda_2}{\omega^2}P + s\lambda_3\omega,$$

wherein s is the number of running pumps, ω is the pump speed (e.g. constant), Δp is the measured pressure differential, P is the power consumption of the running pump(s), and $\lambda_0$, $\lambda_1$, $\lambda_2$ and $\lambda_3$ are pump parameters that may be known from the pump manufacturer or determined by calibration.

Figure 3:
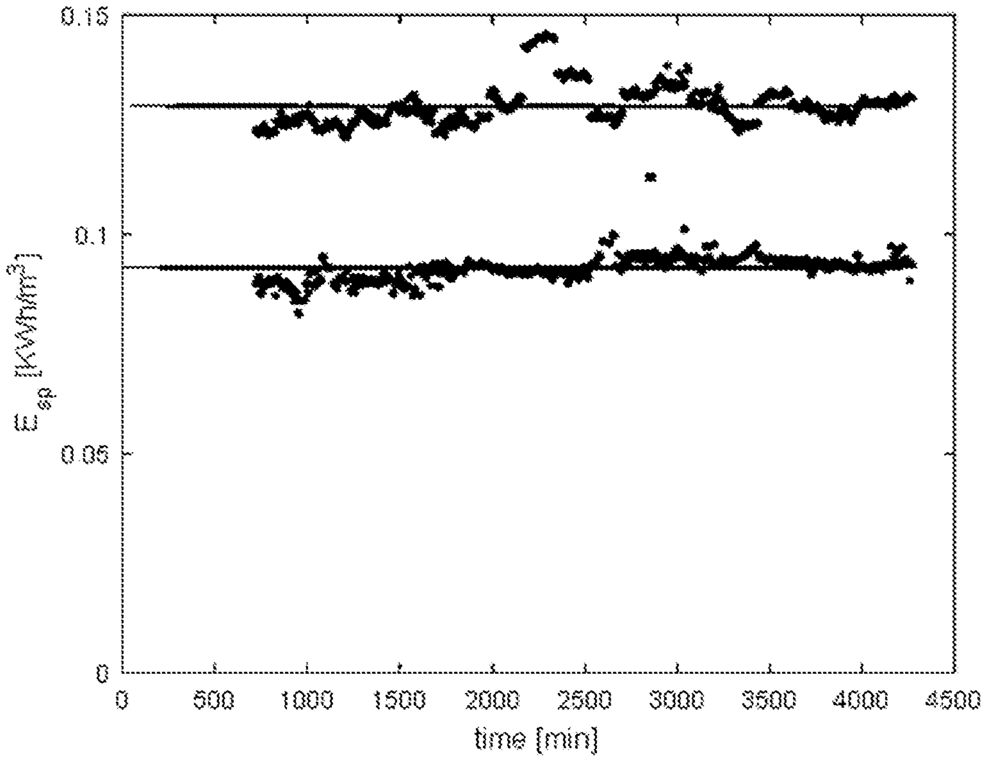
FIG. 3 is a schematic diagram of a specific energy consumption $E_{sp}$ over time for each of two pumps of a wastewater pumping station being connected with an example of the monitoring module according to the present disclosure.

FIG. 3 shows samples of the specific energy consumption $E_{sp}$ for each pump cycle over three days of operation. Each data point represents the specific energy consumption $E_{sp}$ averaged over one pump cycle. Typically, during normal faultless operation, only one of the pumps 9_a_, 9_b_ is active at a time during a pump cycle and they are used in turns, i.e. in alternating order, to evenly distribute operating hours and corresponding wear among the pumps 9_a_, 9_b_. FIG. 3 shows that the first pump 9_a_ has, on average over these three days, a higher specific energy consumption $E_{sp}$ than the second pump 9_b_. As can be seen, the specific energy consumptions $E_{sp}$ fluctuate for both pumps 9_a_, 9_b_ around a respective average specific energy consumption $E_{sp}$ indicated by the horizontal lines.

Figure 4:
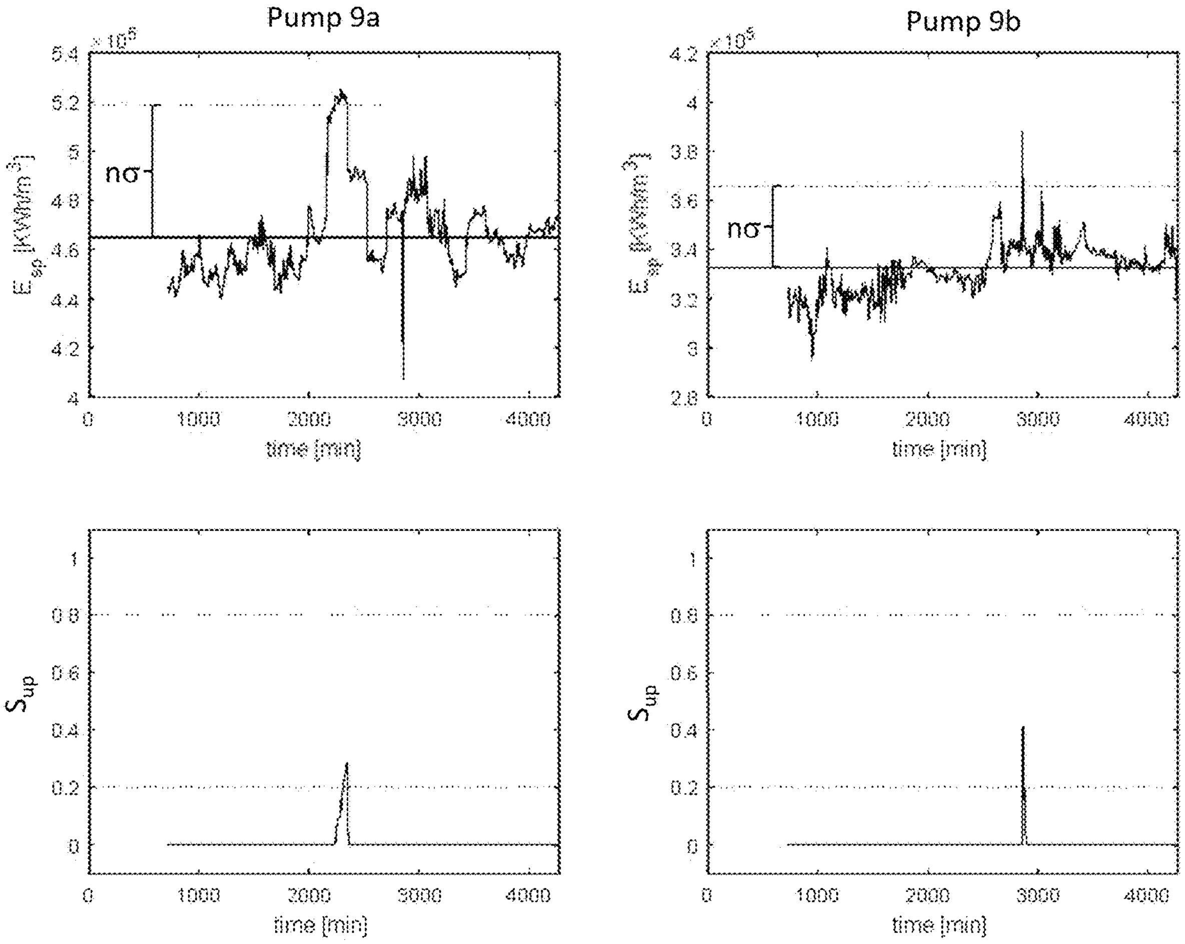
FIG. 4 is a view showing schematic plots of a specific energy consumption $E_{sp}$ and an associated decision variable $S_{up}$ over time for each of two pumps of a wastewater pumping station being connected with an example of the monitoring module according to the present disclosure.

The fluctuations are better visible in the plots shown in FIG. 4, where the upper left plot shows the specific energy consumption $E_{sp}$ of the first pump 9_a_ and the upper right plot shows the specific energy consumption $E_{sp}$ of the first pump 9_a_. In order to improve the identification of operating scenarios and reduce the rate of misidentifications, the monitoring module 13 is configured to apply a low-pass filtering to the at least one load-dependent pump variable. This is very helpful to cope with fluctuations of the specific energy consumption $E_{sp}$. The monitoring module is thus, for each pump 9_a_, 9_b_, configured to sequentially process a multitude of samples of the specific energy consumption $E_{sp}$ and to determine a cumulative sum of deviations between the actual sample and an average of past samples of the specific energy consumption $E_{sp}$. Such a low-pass filtering may follow a so-called iterative CUSUM (cumulative sum) algorithm such as:

$$S_{up}(i+1)=\max[0,S_{up}(i)+G_{up}(x-n\sigma)]$$

$$S_{down}(i+1)=\max[0,S_{down}(i)-G_{down}(x-n\sigma)],$$

wherein $S_{up}$ and $S_{down}$ are decision variables summing up deviations using a test variable x. The test variable x may, for instance, be defined as the deviation of the specific energy consumption in the i-th pump cycle from an average specific energy consumption $\overline{E}_{sp}$, i.e. $x=E_{sp}-\overline{E}_{sp}$. The average specific energy consumption $\overline{E}_{sp}$ may be a predefined value or a value statistically determined over several previous pump cycles during normal faultless operation. For instance, it may be useful to identify non-faulty operating scenarios to statistically determine an average specific energy consumption $\overline{E}_{sp}$. Dependent on the variance of x, the decision variables may be tuned by gain parameters $G_{up}$ and $G_{down}$. Fluctuations below a certain number n, e.g. n=1, 2 or 3, of standard deviations a may be suppressed for the decision variables. Similar to the average specific energy consumption $\overline{E}_{sp}$, the standard deviation σ may be statistically determined over several previous pump cycles during normal faultless operation. The lower left plot of FIG. 4 shows the decision variable $S_{up}$ of the first pump 9_a_ and the lower right plot of FIG. 4 shows the decision variable $S_{up}$ of the second pump 9_b_. As can be seen, the decision variable $S_{up}$ is more robust against fluctuations. A first one of the at least one first criterion based on the specific energy consumption $E_{sp}$ may be whether the decision variable $S_{up}$ is above or below an alarm threshold, e.g. 0.8, indicating that the specific energy consumption $E_{sp}$ is rising. A second one of the at least one first criterion based on the specific energy consumption $E_{sp}$ may be whether the decision variable $S_{down}$ is above or below the alarm threshold, e.g. 0.8, indicating that the specific energy consumption $E_{sp}$ is falling. Although the fluctuations are sometimes above no, the alarm threshold of 0.8 has not been reached in the example shown in FIG. 4, so that the first criterion would not be fulfilled here. Once the alarm threshold of 0.8 has been reached and the first criterion is fulfilled, an alarm reset threshold at 0.2 is useful to reset the first criterion to "unfulfilled" when the decision variable $S_{up}$ has dropped again below the alarm reset threshold at 0.2. Thus, a hysteresis effect is achieved in order to reduce the risk of missing short operating scenarios.

Figure 5:
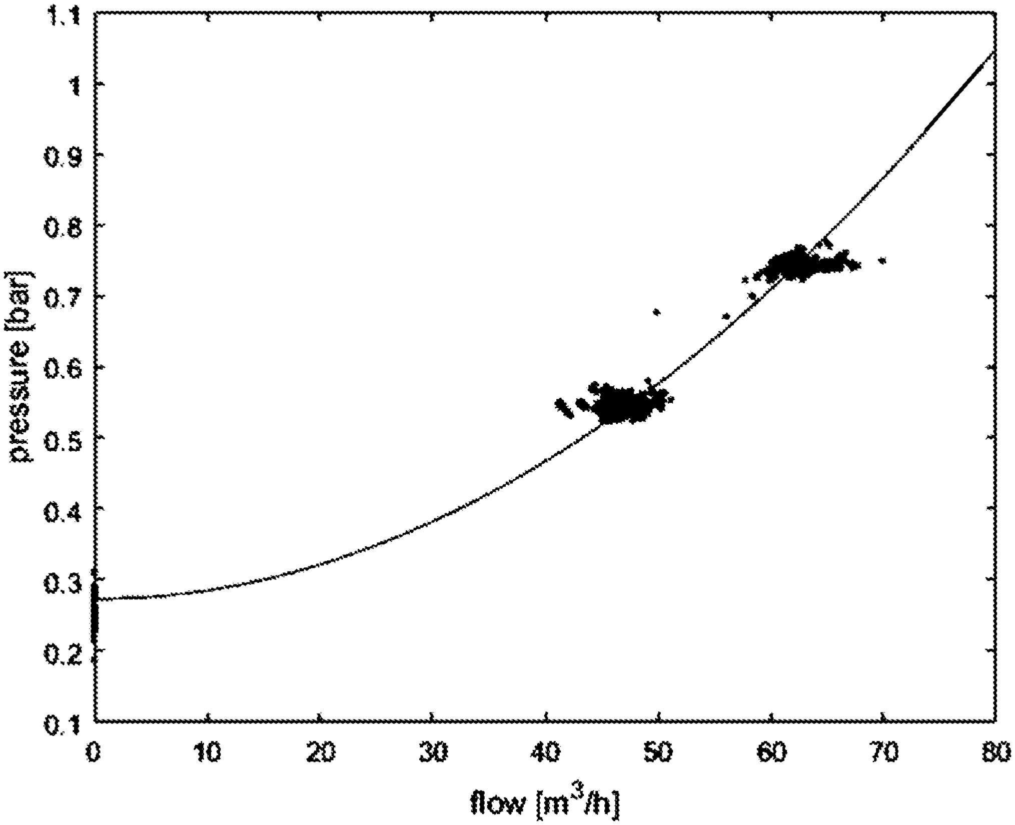
FIG. 5 is a schematic pq-diagram for each of two pumps of a wastewater pumping station being connected with an example of the monitoring module according to the present disclosure.

FIG. 5 shows a schematic pq-diagram for each of two pumps 9*a*, 9*b*. Analogous to FIG. 3, each data point represents the flow q and the pressure q in one pump cycle. Each of the two clouds of data points correspond to one of the pumps 9*a*, 9*b*, which have different performance in this case. The parabola fitted to the data points indicates a pipe model characterized by a pipe model polynomial $p=Aq^2+B$, wherein A is a pipe clogging parameter, p is the pressure measured at or downstream of an outlet of the at least pump, q is a wastewater flow through the pipe 11 and/or the pumps 9*a*, 9*b*, and B is a zero-flow offset parameter. The pipe clogging parameter A and/or the zero-flow offset parameter B may be used as model-based pipe parameters for the at least one second criterion.

However, in order to cope with fluctuations, similar low-pass filtering as described above for the specific energy consumption $E_{sp}$ may be applied to the model-based pipe parameters A, B before selecting an operating scenario dependent on the at least one second criterion. For instance, the evolvement of the pipe clogging parameter A may be monitored by decision variables $S_{up}$ and $S_{down}$ with a test variable x being defined as the deviation of the pipe clogging parameter A in the i-th pump cycle from an average pipe clogging parameter $\overline{A}$, i.e. $x=A-\overline{A}$. Kalman filters may be applied to calculate the mean and variance of the pipe clogging parameter A.

Figure 6:
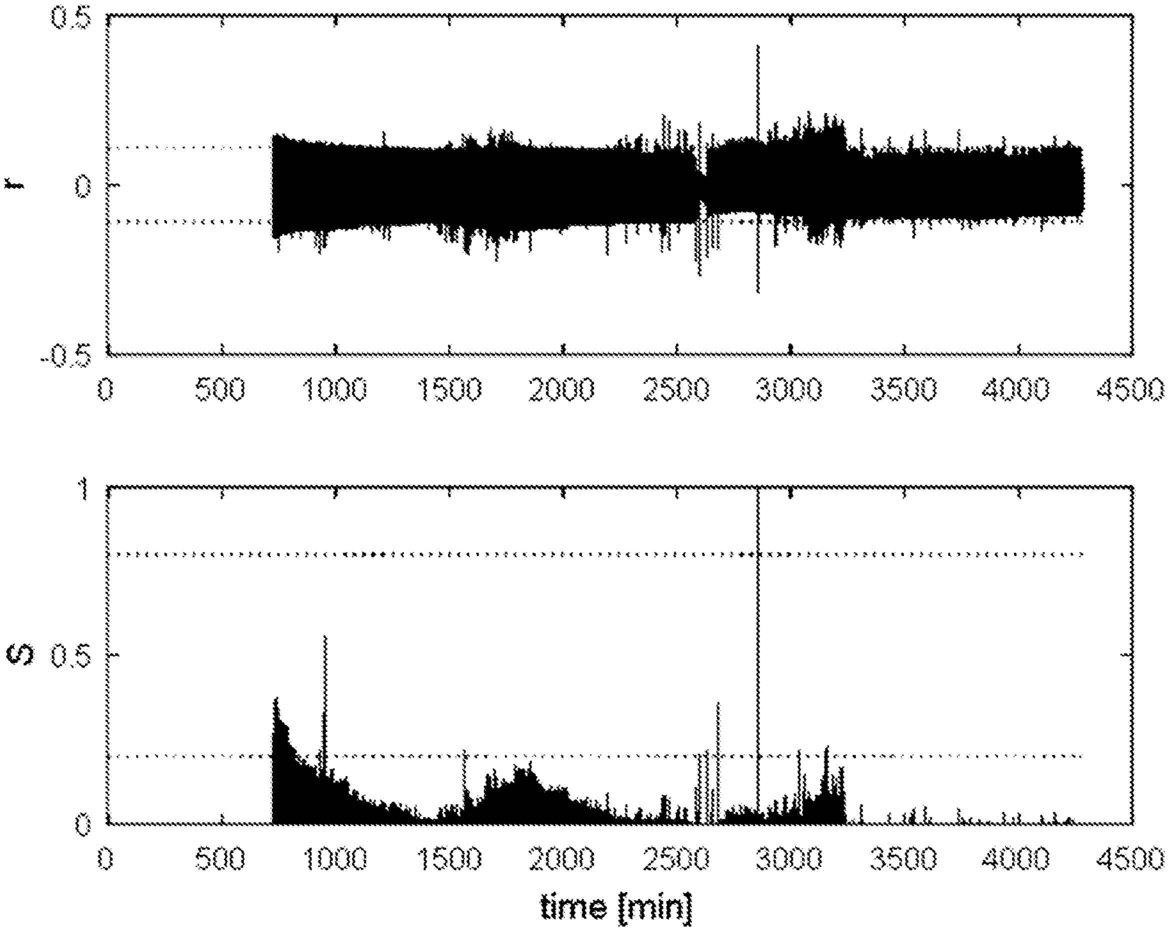
FIG. 6 is a view showing schematic diagrams of a residual r and an associated decision variable S over time for a pipe of a wastewater pumping station being connected with an example of the monitoring module according to the present disclosure.

Alternatively or in addition, as shown in FIG. 6, one of the at least one model-based pipe parameter may be a residual $r=p_m-p_e=p_m-Aq^2-B$ between a measured pressure $p_m$ at or downstream of an outlet of the at least pump and an estimated pressure $p_e$ according to a pipe model polynomial $p_e=Aq^2+B$, wherein A is a pipe clogging parameter of the pipe, q is a wastewater flow through the pipe and/or the at least one pump and B is a zero-flow offset parameter. The residual r may be considered as a pipe model testing parameter. If the residual r deviates from zero by more than a certain threshold, e.g. 100 Pa, one of the at least one second criterion may be fulfilled, otherwise not. Such a fulfilled second criterion may mean a "model mismatch", whereas a non-fulfilled second criterion may mean a "model match". As the residual r also fluctuates significantly, a similar low-pass filtering as described above for the specific energy consumption $E_{sp}$ may be applied to the residual r before selecting an operating scenario dependent on the at least one second criterion. The residual r for testing whether the pipe model still matches with reality may be used as test variable x, i.e. x=r, in the CUSUM algorithm described above. In this case, a combined decision variable $S=S_{up}+S_{down}$ as shown in the lower plot of FIG. 6 may be used to indicate a model mismatch, because there is no need to distinguish between upward and downward fluctuations.

Figure 7:
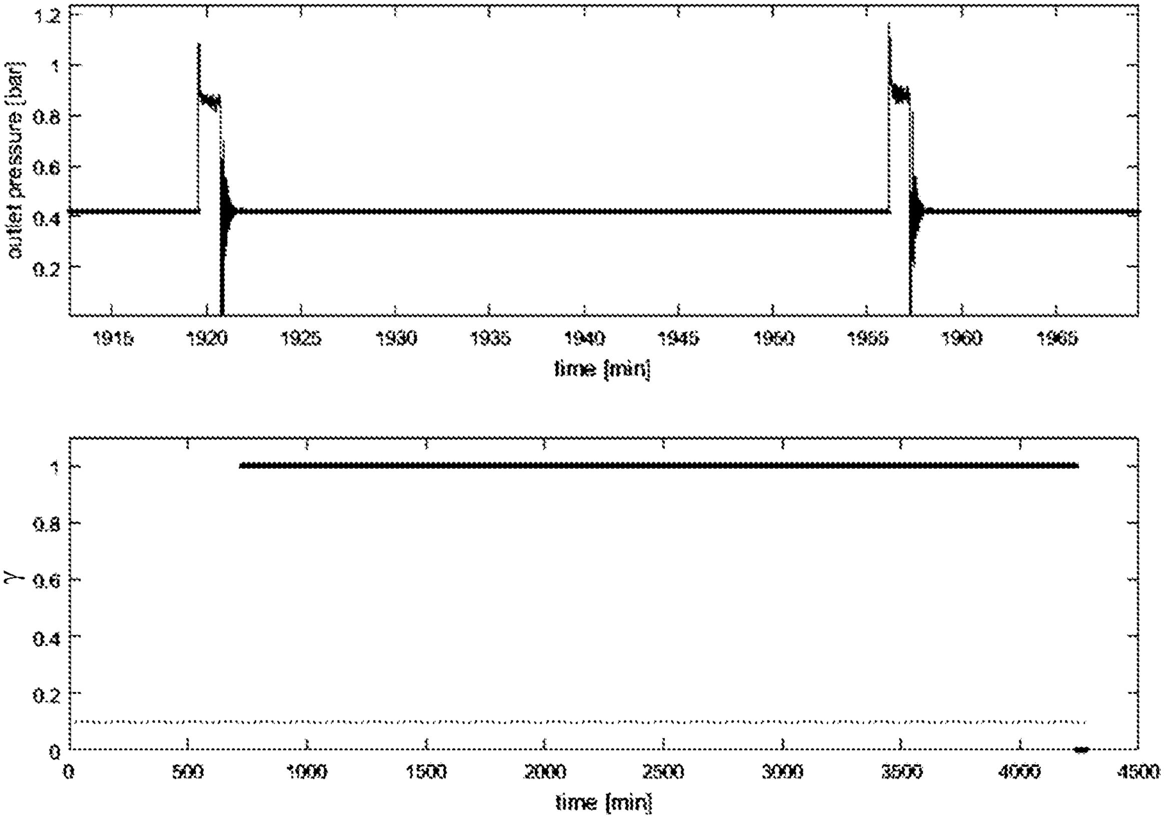
FIG. 7 is a view showing schematic diagrams of a pressure and an associated decision variable γ over time for each of two pumps of a wastewater pumping station being connected with an example of the monitoring module according to the present disclosure.

FIG. 7 shows in the upper plot the pressure p over two pump cycles for a third criterion that may be applied to select an operating scenario. A negative-flow parameter as a basis for the third criterion may be a leakage flow through one of the non-return valves 10*a*, 10*b*, which will gradually lead to a pressure decay when the at least one pump 9*a*, 9*b* is stopped. This may be formulated by $D\dot{p}=-q$, wherein D is the cross-sectional area of the pipe, $$\dot{p} = \frac{dp}{dt}$$

is the change in pressure at the outlet of a pump over time, and q is the leakage flow. Following Toricelli's law, the leakage flow may be calculated by $q=K\sqrt{p-\rho gh-\Delta p_0}$, wherein K is a constant, ρ is the density of the wastewater, p is the measured pressure at an outlet of one of the pumps 9*a*, 10*b, h* is the wastewater's height above the level sensor 5, and $\Delta p_0$ is a hydrostatic pressure of a difference in geodetic elevation between the pump outlet and the level sensor 5. This leads to a differential equation as follows: $A\dot{p}=K\sqrt{p-\rho gh-\Delta p_0}$, which may be approximated by discrete test samples i as follows:

$$p_{i+1} - p_i = -h\frac{K}{A}\sqrt{p_i - \rho g h_i - \Delta p_0},$$

so that a decision variable $$\gamma = -h\frac{K}{A} = \frac{\sqrt{p_i - \rho g h_i - \Delta p_0}}{p_{i+1} - p_i}$$

can be tested for hypotheses $H_0$ and $H_1$ as shown in the lower plot of FIG. 7, wherein $H_0$:γ=0 and $H_1$:γ≠0. As long as hypothesis $H_0$ is rejected, there is probably no leak in the non-return-valve 10*a*, 10*b* as shown in FIG. 7. If the decision variable γ is below a threshold value, for instance 0.1, the hypothesis $H_0$ cannot be rejected and a leakage in the non-return-valve 10*a*, 10*b* is identified. The threshold value may be adjusted to an acceptable compromise between the sensitivity for a leakage in one of the non-return-valves 10*a*, 10*b* and a false alarm rate.

FIGS. 8 and 9 illustrate, by way of selection matrices, how the operating scenario is identified by selecting an operating scenario from a group of seven predefined operating scenarios (seven rows of the selection matrix) dependent on four first criteria (column 1 to 4 of the selection matrix) that are based on the specific energy consumption $E_{sp}$, one second criterion (column 5 of the selection matrix) that is based on the residual r, and one third criterion (column 6) based on the decision variable γ for the negative-flow parameter.

Each of the selection matrices in FIGS. 8 and 9 unambiguously associate each operating scenario with a unique combination of the four first criteria, the second criterion and the third criterion. An "x" in the matrices means that the criterion of this column is fulfilled. The difference between the selection matrices in FIGS. 8 and 9 is that the selection matrix of FIG. 8 is applied when a flow q through the pump(s) is estimated and the selection matrix of FIG. 9 is applied when a flow q through the pipe is measured. This is, because the "scenario signature" depends on whether a flow q through the pipe is measured or a flow q through the pump(s) is estimated. For instance, a leak in a pump connection or a non-return valve 10*a*, 10*b* may result in a rising specific energy consumption $E_{sp}$ when the flow q through the pipe is measured. However, if a flow q through the pump(s) is estimated, the specific energy consumption $E_{sp}$ may turn out to be falling. Therefore, the monitoring module may be configured to apply one of the two predefined selection matrices of FIGS. 8 and 9 dependent on whether a flow q through the pipe is measured or a flow q through the pump(s) is estimated. An estimation of the flow through the pumps 9*a*, 9*b* based on pressure p and power consumption P of the pumps 9*a*, 9*b* has, compared to a flow q measured by a flow meter 25, not only the advantage that the flow meter 25 can be spared with, but also that the scenario signature is different in cases of a leakage of a pump connection or a non-return valve 10*a*, 10*b*. In those cases, the specific energy consumption $E_{sp}$ would appear as falling if the flow through the pump is estimated. If the flow through the pipe 11 is measured, the specific energy consumption $E_{sp}$ would be rising in case of pipe clogging, pump fault/clogging and leakage of a pump connection or a non-return valve. The number of applied criteria may overdetermine one or more of the selection scenarios, which may provide a beneficial redundancy for better differentiating between the operating scenarios at a lower rate of misidentifications.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS

1 wastewater pit
3 inflow port
5 level sensor
7 outflow port
9*a,b* pumps
10*a*, 10*b* non-return valves
11 pipe
13 monitoring module
15 signal connection between pressure sensor and monitoring module
17 signal connection between pressure sensor and monitoring module
19 pressure sensor
21 signal connection between level sensor and monitoring module
23 signal connection between flow sensor and monitoring module
25 flow sensor

The invention claimed is:

1. A wastewater pumping station comprising:
two or more pumps arranged for pumping wastewater out of a wastewater pit into a pipe; and
a monitoring module for identifying an operating scenario in a wastewater pumping station, wherein the monitoring module is configured to process at least one load-dependent pump variable for each running pump of the two or more pumps indicative of how a respective running pump operates and to process a first of at least two model-based pipe parameters indicative of how the wastewater flows through the pipe and/or the pumps, and to process a negative-flow parameter as a second of the at least two model-based pipe parameters, wherein the negative-flow parameter is indicative of how the wastewater flows through the pipe and/or one or more non-running pumps of the pumps when at least one of the pumps is stopped, wherein the monitoring module is configured to identify an operating scenario in the wastewater pumping station by selecting an operating scenario from a group of predefined operating scenarios dependent on at least one first criterion for each running pump of the pumps that is based on the at least one load-dependent pump variable, at least one second criterion that is based on at least the first of the at least two one model-based pipe parameters and at least one third criterion that is based on the negative-flow parameter.

2. The wastewater pumping station of claim 1, wherein the group of operating scenarios is predefined in a selection matrix associating each operating scenario with a unique combination of the at least one first criterion and the at least one second criterion.

3. The wastewater pumping station of claim 1, wherein the at least one load-dependent pump variable comprises a specific energy consumption $E_{sp}$ of the respective running pump.

4. The wastewater pumping station of claim 3, wherein the specific energy consumption $E_{sp}$ of the respective running pump is defined by $E_{sp}=E/V$, wherein E is an average energy consumed by the respective running pump during a defined time period and V is the volume of wastewater pumped during said defined time period by the respective running pump.

5. The wastewater pumping station of claim 3, wherein the specific energy consumption $E_{sp}$ of the respective running pump is defined by $E_{sp}=P/q$, wherein P is a power consumption of the respective running pump and q is a flow of wastewater pumped by the respective running pump.

6. The wastewater pumping station of claim 1, wherein one of the at least one model-based pipe parameter is a pipe clogging parameter A in a pipe model polynomial $p=Aq^2+B$, wherein p is a pressure at or downstream of an outlet of at least one of the pumps, q is a wastewater flow through the pipe and/or the pumps, and B is a zero-flow offset parameter.

7. The wastewater pumping station of claim 1, wherein one of the at least one model-based pipe parameter is a residual $r=p_m\ p_e=p_m\ Aq^2-B$ between a measured pressure $p_m$ at or downstream of an outlet of at least one of the pumps and an estimated pressure $p_e$ according to a pipe model polynomial $p_e=Aq^2+B$, wherein A is a pipe clogging parameter, q is a wastewater flow through the pipe and/or the pumps and B is a zero-flow offset parameter.

8. The wastewater pumping station of claim 1, wherein the monitoring module is configured to receive a measured pressure $p_m$ at or downstream of an outlet of at least one of the pumps.

9. The wastewater pumping station of claim 1, wherein the monitoring module is configured to receive a measured flow $q_m$ through the pipe or to process an estimated wastewater flow $q_e$ through the pumps.

10. The wastewater pumping station of claim 1, wherein the monitoring module is configured to apply a low-pass filtering to the at least one load-dependent pump variable and/or the at least one model-based pipe parameter before selecting an operating scenario dependent on the at least one first criterion and/or the at least one second criterion, respectively.

11. The wastewater pumping station of claim 1, wherein the monitoring module is configured to sequentially process a multitude of samples of the at least one load-dependent pump variable, wherein the at least one first criterion is based on whether a cumulative sum of deviations between the actual sample and an average of past samples of the at least one load-dependent pump variable exceeds a predetermined maximum or falls below a predetermined minimum.

12. The wastewater pumping station of claim 1, wherein the monitoring module is configured to sequentially process a multitude of samples of the at least one model-based pipe parameter, wherein the at least one second criterion is based on whether a cumulative sum of deviations between the actual sample and an average of past samples of the at least one model-based pipe parameter exceeds a predetermined maximum or falls below a predetermined minimum.

13. A method for identifying an operating scenario in a wastewater pumping station with two or more pumps arranged for pumping wastewater out of a wastewater pit into a pipe, wherein the method comprises:

processing at least one load-dependent pump variable for each running pump of the two or more pumps indicative of how the respective running pump operates;

processing a first of at least two model-based pipe parameters indicative of how the wastewater flows through the pipe and/or the pumps;

processing a negative-flow parameter as a second of the at least two model-based pipe parameters, wherein the negative-flow parameter is indicative of how the wastewater flows through the pipe and/or one or more non-running pumps of the pumps when at least one of the pumps is stopped; and selecting an operating scenario from a group of predefined operating scenarios dependent on at least one first criterion that is based on the at least one load-dependent pump variable, at least one second criterion that is based on at least the first of the at least one model-based pipe parameters, and at least one third criterion that is based on the negative-flow parameter.

14. The method of claim 13, wherein the group of operating scenarios is predefined in a selection matrix unambiguously associating each operating scenario with a unique combination of the at least one first criterion and the at least one second criterion.

15. The method of claim 13, wherein the at least one load-dependent pump variable comprises a specific energy consumption $E_{sp}$ of the respective running pump.

16. The method of claim 15, wherein the specific energy consumption $E_{sp}$ of the pumps is defined by $E_{sp}=E/V$, wherein E is an average energy consumed during a defined time period and V is the volume of wastewater pumped during said defined time period by the respective running pump.

17. The method of claim 15, wherein the specific energy consumption $E_{sp}$ of the respective running pump is defined by $E_{sp}=P/q$, wherein P is a power consumption and q is a flow of wastewater pumped by the respective running pump.

18. The method of claim 13, wherein one of the at least one model-based pipe parameter is a pipe clogging parameter A in a pipe model polynomial $p=Aq^2+B$, wherein p is a pressure at or downstream of an outlet of at least one of the pumps, q is the wastewater flow through the pipe and/or the pumps, and B is a zero-flow offset parameter.

19. The method of claim 13, wherein one of the at least one model-based pipe parameter is a residual $r=p_m\ p_e=p_m\ Aq^2-B$ between a measured pressure $p_m$ at or downstream of an outlet of at least one of the pumps and an estimated pressure $p_e$ according to a pipe model polynomial $p_e=Aq^2+B$, wherein A is a pipe clogging parameter, q is the wastewater flow through the pipe and/or the pumps and B is a zero-flow offset parameter.

20. The method of claim 13, further comprising receiving a measured pressure $p_m$ at or downstream of an outlet of at least one of the pumps.

21. The method of claim 13, further comprising receiving a measured flow $q_m$ through the pipe or processing an estimated wastewater flow $q_e$ through the pumps.

22. The method of claim 13, further comprising applying a low-pass filtering to the at least one load-dependent pump variable and/or the at least one model-based pipe parameter before selecting an operating scenario dependent on the at least one first criterion and/or the at least one second criterion, respectively.

23. The method of claim 13, further comprising sequentially processing a multitude of samples of the at least one load-dependent pump variable, wherein the at least one first criterion is based on whether a cumulative sum of deviations between the actual sample and an average of past samples of the at least one load-dependent pump variable exceeds a predetermined maximum or falls below a predetermined minimum.

24. The method of claim 13, further comprising sequentially processing a multitude of samples of the at least one model-based pipe parameter, wherein the at least one second criterion is based on whether a cumulative sum of deviations between the actual sample and an average of past samples of the at least one model-based pipe parameter exceeds a predetermined maximum or falls below a predetermined minimum.

25. A method, comprising:

providing a wastewater pumping station comprising at least two pumps arranged for pumping wastewater out of a wastewater pit into a pipe;

processing at least one load-dependent pump variable for each running pump of the two or more pumps indicative of how the respective running pump operates;

processing a first of at least two model-based pipe parameters indicative of how the wastewater flows through the pipe and/or the pumps;

processing a negative-flow parameter as a second of the at least two model-based pipe parameters, wherein the negative-flow parameter is indicative of how the wastewater flows through the pipe and/or one or more non-running pumps of the pumps when at least one of the pumps is stopped; and identifying an operating scenario in the wastewater pumping station based on at least one first criterion that is based on the at least one load-dependent pump variable, at least one second criterion that is based on at least the first of the at least one model-based pipe parameters, and at least one third criterion that is based on the negative-flow parameter.

26. The method of claim 25, wherein the operating scenario corresponds to at least one of a clogged pump condition, a leaking pump connection and a leaking non-return valve.

* * * * *